| United States Patent [19] | [11] | 3,973,056 |
| Fessler et al. | [45] | Aug. 3, 1976 |

[54] INHIBITION OF STRESS-CORROSION CRACKING OF STEEL PIPELINE

[75] Inventors: Raymond Roy Fessler; Warren Elmer Berry, both of Columbus; Russell Lee Wenk, Westeville, all of Ohio; Redvers Nicholson Parkins, Newcastle-upon-Tyne, England

[73] Assignee: American Gas Association, Inc., Arlington, Va.

[22] Filed: June 6, 1974

[21] Appl. No.: 477,169

[52] U.S. Cl. .................................. 427/136; 106/14; 138/145; 138/DIG. 6; 156/187; 252/387; 427/403; 427/409; 427/419; 427/427; 428/36
[51] Int. Cl.$^2$ ..................... F16L 58/04; C23F 13/00
[58] Field of Search ........... 427/136, 409, 403, 419, 427/427; 106/14; 252/387; 117/121, 94, 75, 104 R; 428/36, 468; 148/6.15 R; 138/DIG. 6

[56] References Cited
UNITED STATES PATENTS

| 2,685,523 | 8/1954 | Cross et al. .......................... 106/14 |
| 2,861,892 | 11/1958 | Radd et al. ........................... 106/14 |
| 2,883,289 | 4/1959 | Furey et al. .......................... 106/14 |
| 3,070,065 | 12/1962 | Hill ................................... 117/94 X |
| 3,333,973 | 8/1967 | Freiman .............................. 106/14 X |
| 3,354,169 | 11/1967 | Shafer et al. ................ 117/104 R X |
| 3,357,927 | 12/1967 | Marsh et al. ..................... 106/14 X |
| 3,468,687 | 9/1969 | Thomas ............................ 106/14 X |
| 3,689,305 | 9/1972 | Hausmann ........................ 117/94 X |

OTHER PUBLICATIONS

Fraser, Corrosion Control in Idle Pipelines, Materials Performance, Mar. 1974, pp. 29–30.
Holzworth et al., Inhibition of Stress Corrosion in Type 304 Stainless Steel by Lithium Silicate, Corrosion–Nace, vol. 25, No. 7, July 1969, pp. 287–288.

*Primary Examiner*—Ralph Husack
*Attorney, Agent, or Firm*—Howson and Howson

[57] ABSTRACT

A method for inhibiting stress-corrosion cracking of a steel pipeline transmitting gas under elevated pressure provided with an external protective coating and means for cathodic protection, and steep pipe and pipelines so protected are described. The method consists of introducing a composition containing at least one of the inhibitors, calcium monobasic phosphate, sodium monobasic phosphate, sodium tripolyphosphate and potassium silicate, into a buried pipeline environment. The inhibiting composition may be simply introduced to the environment adjacent the pipeline or it may be incorporated in a coating on the pipeline, either in the primer or in a top coating thereover or in an intermediate coating between a conventional primer and topcoating, or in a tape applied to the pipeline.

20 Claims, 6 Drawing Figures

INHIBITION OF STRESS-CORROSION CRACKING OF STEEL PIPELINE

BACKGROUND OF THE INVENTION

A number of years ago it was discovered that steel pipelines transmitting gas under substantial pressure in contact with or buried in the soil were subject to stress-corrosion cracking and consequent failure. Since that time considerable work has been done in an effort to determine the causes for such stress-corrosion cracking and to find solutions to the problem. In general, such studies have concentrated on three areas, i.e., (1) modifying the steel from which the pipes are made, (2) modifying operating practices involving stress, temperature and cathodic protection, and (3) modifying the environment. It presently appears that the most promising approach to the protection of pipelines against such stress-corrosion cracking resides in modification of the environment of the pipeline. This may be done in a variety of ways including incorporation of an appropriate inhibitor in the primer or other coating on the pipeline or any other means for introducing an effective inhibitor to the environment adjacent the pipeline.

Considerable work has been done to identify the causes of stress-corrosion cracking and in particular those environments which may encourage such cracking. Field and laboratory studies have indicated that the most probable environments that may cause stress-corrosion cracking are aqueous solutions of bicarbonate, carbonate-bicarbonate mixtures, hydroxides or nitrates. More specifically, chemical analyses of liquids found under coatings near the locations of stress-corrosion cracks in buried pipelines have shown that the principal components in most of the liquid samples were carbonate and bicarbonate ions. Some of the samples tested also contained small amounts of other ions such as the hydroxide ion, chloride ion and nitrate ion. In addition, crystals of sodium bicarbonate have been found on pipe surfaces near stress-corrosion cracks. A review of the literature indicates that nitrates and hydroxides can cause stress-corrosion cracking of mild steels but until recently there had been no evidence that carbonates or bicarbonates could cause such cracking. However, laboratory studies have indicated that stress-corrosion cracks can be produced in pipe steel using sodium carbonate-bicarbonate solutions and sodium bicarbonate solutions. Therefore, it is now believed that stress-corrosion cracking of buried pipelines is encouraged by carbonate-, hydroxide- and nitrate-containing environments.

THE PRIOR ART

The literature is replete with information dealing with the chemical inhibition of corrosion of metals used in engineering structures. In general, inhibitors for this purpose may be classified as passivators, organic inhibitors such as slushing compounds, pickling inhibitors, vapor-phase inhibitors and other coatings which can be divided into three basic groups, i.e., metallic coatings, inorganic coatings and organic coatings. Metallic coatings include noble coatings such as nickel, silver, copper, lead or chromium and sacrificial coatings such as zinc or cadmium. In certain environments aluminum and tin act as sacrificial coatings for steel. Inorganic coatings include vitreous enamels, Portland cement and chemical-conversion coatings such as phosphate, oxide and chromate coatings. Organic coatings include paints, varnishes, waxes, coal tar enamels, asphalt enamels and epoxy resin coatings. Paint pigments incorporated in the prime coat may be effective corrosion inhibitors. Among the pigments that provide protection for steel are red lead, zinc chromate and zinc tetroxychromate. Paints pigmented with zinc dust are also used as prime coats. The zinc dust is incorporated in a vehicle such as chlorinated rubber, polystyrene, epoxy or polyurethane. The function of the zinc is to act as a sacrificial coating and cathodically protect the steel in the same manner as it does in galvanized coatings.

A significant volume of literature also exists concerning the use of chemical inhibitors to prevent or retard stress-corrosion cracking of steels in hydroxides and nitrates. Much of the work reported has been directed toward the prevention of stress-corrosion cracking in hydroxide environments and in particular toward the treatment of boiler feed water with additions of sodium nitrate, phosphates or tannins. Much less work has been done on the problem of environmental cracking in nitrate environments.

Inhibition of stress-corrosion cracking can occur through more than one mechanism. For any given environment, stress-corrosion cracking is possible only within a certain limited range of potentials. In a system with no stray or imposed currents, stress-corrosion cracking will occur only if the free-corrosion potential of the metal in that environment falls within the critical range of potentials for such cracking. If a chemical added to the environment causes either the free-corrosion potential or the critical potential range for stress-corrosion cracking (SCC) to shift so that they are no longer coincident, the chemical is considered an inhibitor of stress-corrosion cracking. However, such a chemical is usually considered an unsafe inhibitor for a system with stray or imposed currents, because these currents may push the potential back into the critical range in spite of the presence of the inhibitor. Some other chemicals will retard or stop cracking at all potentials. This latter type is considered a safe inhibitor and is preferred in the pipeline situation where cathodic-protection currents might put the potential anywhere in the range between the free-corrosion potential and several volts negative with respect to a copper-copper sulfate reference electrode.

Among the prior art of interest, we may mention Gravell U.S. Pat. No. 1,367,597 issued Feb. 8, 1921, which teaches the use of "calcium phosphate" in paint for preventing rusting of iron and steel, but which does not specify exactly what phosphate of calcium is employed.

Richardson U.S. Pat. No. 2,104,528 issued Jan. 4, 1938 shows recognition of the fact that stress-corrosion cracking is in inter-crystalline or inter-granular phenomena. Such stress-corrosion cracking was observed by the patentees in boilers containing sodium hydroxide or sodium carbonate and they found that it could be inhibited by the incorporation of trisodium phosphate ($Na_3PO_4$) or sodium monobasic phosphate ($NaH_2PO_4$), the latter being one of the inhibitors of the present invention. There is, however, no suggestion in this reference that any of these inhibitors would be effective to prevent stress-corrosion cracking in a buried pipeline having applied cathodic protection, or in the presence of a nitrate environment.

Schroeder et al U.S. Pat. No. 2,454,258 issued Nov. 16, 1948 is concerned with the treatment of boiler water to prevent embrittlement or inter-crystalline cracking caused by any build-up of sodium hydroxide or sodium silicate in the boiler. It is explained how very dilute and innocuous solutions of these materials can become sufficiently concentrated in restricted area due to evaporation to cause such cracking. It is stated at column 2, lines 14-20 that it is highly desirable to avoid the presence of sodium carbonate and sodium hydroxide in boiler water, although it is paradoxically desirable to maintain a certain degree of alkalinity. The patentees recommend employing thermally stable salts of weak acids for this purpose and specifically suggest trisodium phosphate in combination with alkali dihydrogen phosphate as a suitable acidic substance. Suitable salts listed also include silicates and secondary and tertiary phosphates.

Buchan U.S. Pat. No. 2,560,331 issued July 10, 1951 relates to the prevention of corrosion in oil or gas wells which may be caused, among other things, by solution of carbon dioxide in water in the well. The patent suggests that such corrosion may be inhibited by shutting-down the well and adding to the corrosive solutions in the well a solution of an alkaline metal silicate, e.g., sodium, potassium or lithium silicate. It is believed that such solutions wet the inner surface of the tubing and/or well casing and react with acidic corrosive materials present to form a protective silicate scale on the ferrous surfaces. There is no teaching or suggestion in this reference that potassium silicate would inhibit stress-corrosion cracking in a buried pipeline having applied cathodic protection.

Fuchs U.S. Pat. No. 3,130,002 issued July 10, 1951 and 3,272,588 issued Sept. 13, 1966 relate to the use of certain sodium phosphate glasses in the inhibition of corrosion of metals.

It is apparent from the foregoing and numerous other references in the art that it is well-known that various phosphates and silicates are useful in the inhibition of corrosion of iron and steel under varying conditions in a variety of environments. Indeed, it is known that sodium monobasic phosphate is useful in boiler water containing sodium hydroxide or carbonate for the inhibition of inter-crystalline cracking, and that potassium silicate is useful for preventing corrosion of the interior or exterior surfaces of an oil or gas well casing. Despite the voluminous and extensive prior art on the inhibition of corrosion in iron and steel by the use of a wide variety of inhibitors, so far as we are aware, the art has not suggested any system for protecting a steel pipeline having cathodic protection and carrying gas under substantial pressure in contact with soil to prevent stress-corrosion cracking.

It is, therefore, a primary object of the present invention to provide a system for inhibiting stress-corrosion cracking of steel pipelines, provided with cathodic protection, in contact with the soil, and carrying gas under high pressure.

It is another object of the invention to provide inhibition of stress-corrosion cracking due to carbonate-bicarbonate-, hydroxide- and nitrate-containing aqueous environments.

It is still another object of the invention to provide a system for inhibiting stress-corrosion cracking which will be effective in a pipeline having applied cathodic protection in a wide variety of environments.

SUMMARY OF THE INVENTION

The foregoing and other objects of the present invention are achieved by providing a system for inhibiting stress-corrosion cracking of a steel pipeline transmitting gas under elevated pressure provided with an external protective coating and means for cathodic protection, and which is in contact with an environment containing an aqueous solution of at least one material selected from the group consisting of the alkali metal and alkaline earth metal hydroxides, carbonates, carbonate-bicarbonate mixtures and nitrates, which involves introducing into the environment in contact with the pipeline, a composition containing at least one of the following inhibitors: calcium monobasic phosphate, sodium monobasic phosphate, sodium tripolyphosphate, and potassium silicate; the composition being employed in an amount such as to provide an inhibitor concentration effective to inhibit stress-corrosion cracking of the pipeline.

These materials are intended to be supplied to the environment adjacent a buried pipeline in sufficient quantities to inhibit stress-corrosion cracking. In general, amounts sufficient to provide a concentration in the environment adjacent to the pipeline of about 1% or even as little as 0.01% in some cases are adequate to protect the pipeline against stress-corrosion cracking. The means of introducing inhibitors into the environment vary widely. The presently preferred method of application of the inhibitors is in a coating system applied to the pipeline before the pipeline is buried. This may be accomplished either by incorporating the inhibitors in the primer, or in an additional layer of coating material applied between the primer and the top coat, or the inhibitor may, indeed, be placed in the top coat itself. Incorporation of the inhibitor materials in the primer is preferred. Somewhat less preferred is the practice of incorporating the inhibitors in a coating applied over the primer. Such applications have the advantage of positioning the inhibiting materials either directly against or very close to the pipeline and are, therefore, likely to prove more effective than incorporation of the inhibitor in the top coat. The inhibitors may also be included in a tape which is applied to the exterior surface of the pipeline or, indeed, they may even be introduced directly to the soil itself or by dissolution in water which is then applied to the pipeline and adjacent soil in order to carry the inhibitor into the ground. The particular method of application of the inhibitor to the pipeline or its environment will depend to some degree upon the nature of the primer and any intermediate or top coat on the pipeline, since the inhibitors must be compatible with such materials and be capable of application therewith. For example, where the inhibitor is employed in a coating such as coal-tar, asphalt, or in an epoxy type coating, which is employed at an elevated temperature, the inhibitor must, of course, be stable at the temperature of application.

DETAILED DESCRIPTION OF THE INVENTION

Figure 1:
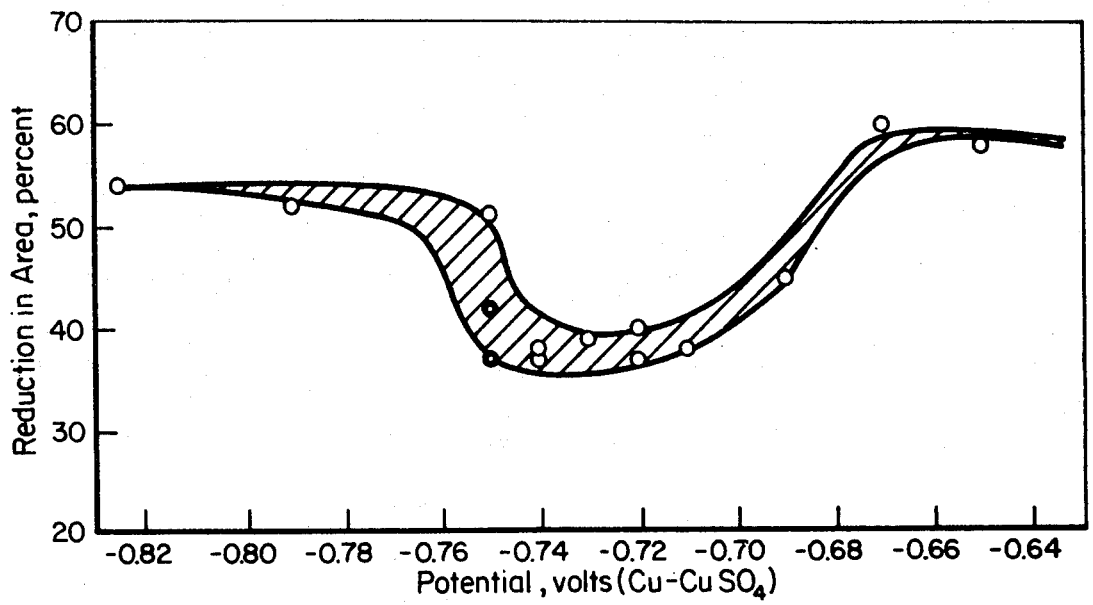
FIG. 1 is a graph showing the effect of potential on reduction in area exhibited by specimens of pipe steel broken in constant-strain-rate tests in $1N\ Na_2CO_3 + 1N\ NaHCO_3$ with no additive (180°F, $2.5 \times 10^{-6}\ sec^{-1}$).
Figure 2:
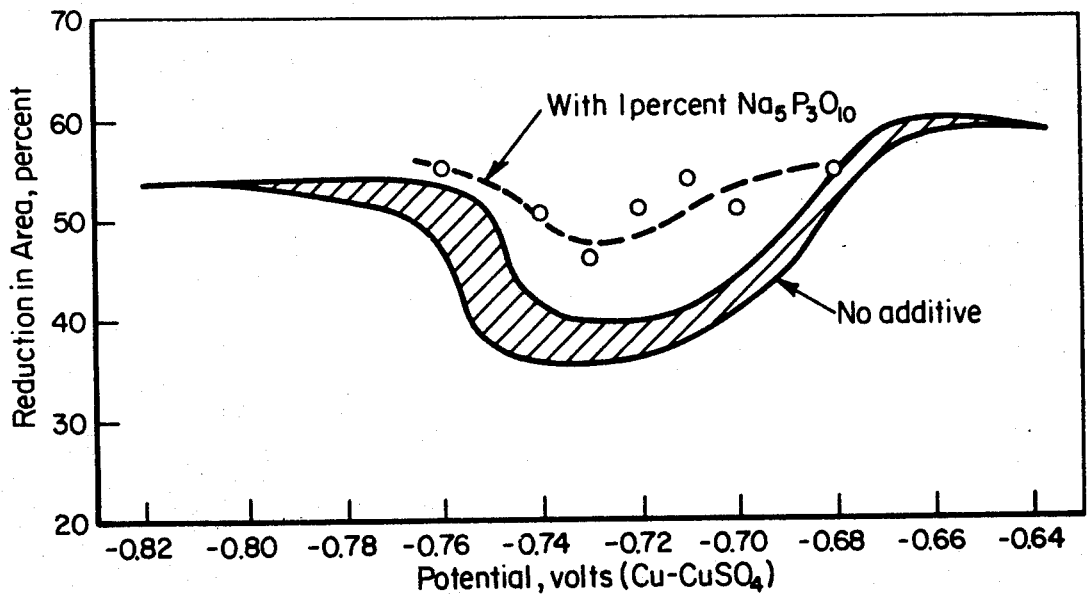
FIG. 2 is a graph showing the improvement of reduction in area of specimens of pipe steel broken in constant-strain-rate tests in 1N $Na_2CO_3$ + 1N $NaHCO_3$ with 1% $Na_5P_3O_{10}$ added (180°F, 2.5 × $10^{-6}$ $sec^{-1}$).
Figure 3:
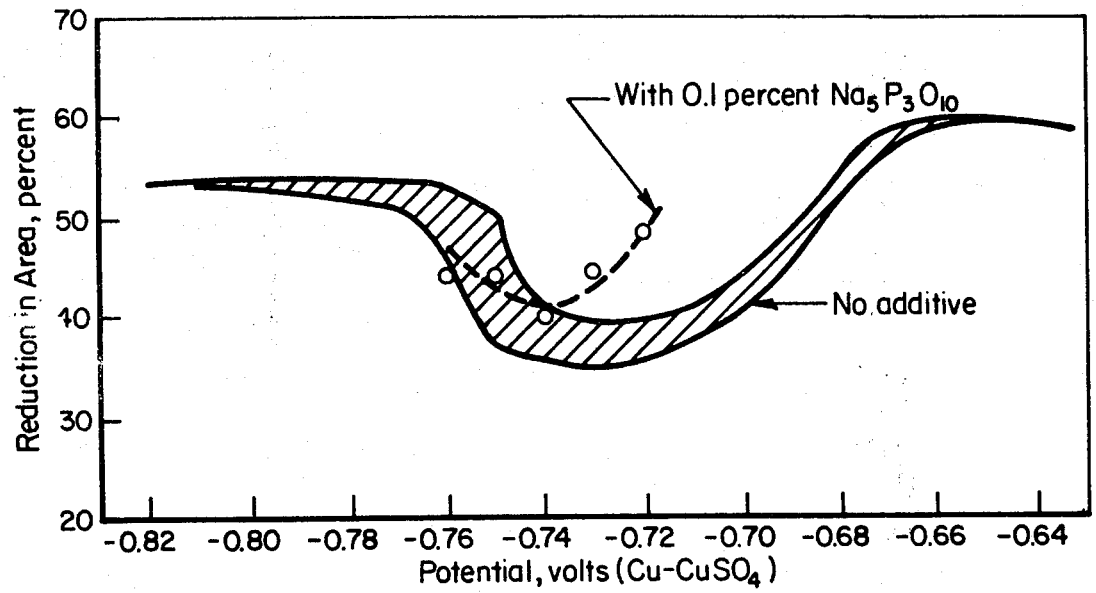
FIG. 3 is a graph showing the effect of adding 0.1% $Na_5P_3O_{10}$ to 1N $Na_2CO_3$ + 1N $NaHCO_3$ on the SCC behavior of specimens of pipe steel broken in constant-strain-rate tests (180°F, 2.5 × $10^{-6}$ $sec^{-1}$).
Figure 4:
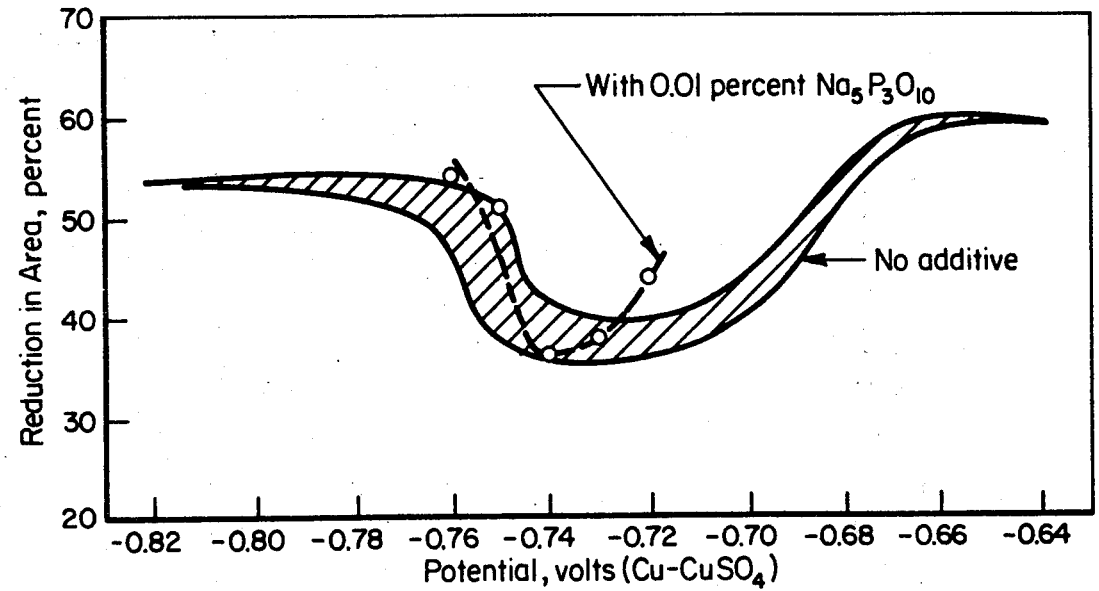
FIG. 4 is a graph showing the effect of adding 0.01% $Na_5P_3O_{10}$ to 1N $Na_2CO_3$ + 1N $NaHCO_3$ on the SCC behavior of specimens of pipe steel broken in constant-strain-rate tests (18°F, 2.5 × $10^{-6}$ $sec^{-1}$).

The four inhibitors of the present invention are useful for preventing stress-corrosion cracking of buried pipelines carrying gas under elevated pressure in widely varied environments. In order to evaluate the universal utility of these inhibitors it was first necessary to determine the types of environments that cause stress-corrosion cracking in steel pipelines under pressure. Chemical analysis of liquids found under coatings near the locations of stress-corrosion cracks in buried pipelines and various geographical locations are set forth in Table I below:

TABLE I

COMPOSITION OF LIQUIDS FOUND UNDER COATINGS NEAR THE LOCATIONS OF STRESS-CORROSION CRACKS

| State | pH | $CO_3$ | $HCO_3$ | OH | Cl | $NO_3$ |
|---|---|---|---|---|---|---|
| Alabama | 9.7 | 0.5 | 0.5 | — | — | — |
| Arizona | 12.3 | 1.0 | N* | 0.1 | 0.01 | 0.007 |
| Mississippi | 10.0 | 1.4 | 0.5 | N* | 0.12 | 0.004 |
| Mississippi | 10.0 | 0.9 | 0.8 | N* | 0.12 | <0.01 |
| Mississippi | 9.6 | 0.5 | 0.6 | N* | N* | — |
| North Carolina | 10.5 | 0.7 | 0.4 | N* | — | N |

*N = nondetectable

It has also been reported in the literature that sodium hydroxide solution can cause stress-corrosion cracking of low-carbon mild steel. Our laboratory experiments verify that a sodium hydroxide solution also causes stress-corrosion cracking in pipe steels and, therefore, it is probable that such an environment causes stress-corrosion cracking in buried pipelines.

There is reason to believe that large amounts of hydroxides, carbonates, or bicarbonates may be generated in liquids near the pipe surfaces by the action of the cathodic protection currents. At the cathode, which is the pipe, the following reactions may take place.

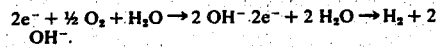

Then, carbon dioxide from the soil can react with the hydroxyl ions to form bicarbonate and carbonate ions, as follows:

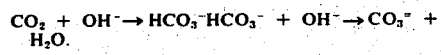

Depending upon the details of the system, various amounts of hydroxyl, bicarbonate, and/or carbonate ions could be present.

A large amount of work has shown that mild steels are very susceptible to stress-corrosion cracking (SCC) in nitrate solutions. Our laboratory experiments have verified that pipe steels are also susceptible to SCC in these solutions. The nitrate ion, which is present in most soils, may be concentrated near the pipe surface. The heat of the pipe may evaporate some of the water and leave a more concentrated solution of nitrates. Thus, a nitrate solution becomes the third solution suspected of causing SCC in buried pipelines.

CRITERIA FOR JUDGING INHIBITORS

In evaluating a wide variety of chemical additives in the three SCC environments, certain criteria were established which the chemical additive should meet to be considered an acceptable inhibitor:

1. It must significantly retard SCC at the natural potential therefor in the three suspected environments.
2. It must significantly retard SCC at imposed potentials, particularly more negative potentials which would be the direction of potential shift to be expected from cathodic-protection currents. This criterion was not considered to be significant for the nitrate environment because, for this environment, the free-corrosion potential is always near the negative end of the critical range of potential for cracking and any shift in potential from the cathodic-protection system should improve the situation. On the other hand, in bicarbonates, carbonate-bicarbonates, or caustics, the corrosion potential of the steel could easily be near either end of the critical range for cracking and, if near the less negative end, the imposition of a negative potential could result in the steel falling within the critical range.
3. It should be effective at various concentrations of oxygen in the environments. Different soils may contain different amounts of oxygen, so the inhibitor must be effective regardless of the oxygen content.
4. It must be nontoxic to plants and animals.
5. It must be economical.

In addition to the above-listed general criteria, there are additional requirements that depend on whether the inhibitor is to be used with presently buried pipe or in coating systems for future pipe. For presently buried pipe, the inhibitor should:

1. Be capable of stopping a crack that has already started, and
2. Have satisfactory mobility in soils, so that it can be carried to the pipe by groundwater in a reasonable time; but it should not be so mobile that it is carried away from the pipe too rapidly. If the inhibitor is to be added to the coating or primer, it should have the following properties:

1. It must be compatible with the coating or primer. Its presence in the coating or primer should not harm the other desirable properties of the coating such as strength, adherence and resistance to water penetration.
2. It must be leachable from primer or coating at a reasonable rate so that it will be available in any water solution that develops between the coating and the pipe.

EVALUATION OF THE INHIBITORS

A series of experiments were conducted in which specimens of pipe steel were stressed in solutions that can cause stress-corrosion cracking, but to which various amounts of the inhibitors were added. The following steps were involved in testing the inhibitors:

1. A large number of chemicals were selected to be evaluated. The chemicals included those listed in the literature as SCC inhibitors, known corrosion inhibitors, common soil constituents, and complex organic compounds; other materials were included because it was felt intuitively that they might prevent SCC.

2. Preliminary screening was accomplished by adding each prospective inhibitor to one of the three environments capable of producing SCC. If the chemical did not retard cracking significantly, it was eliminated from the list.

3. Those chemicals that survived the preliminary screening were then tested in the other two environments at the most probable potential for cracking.

4. The chemicals that were effective inhibitors at the most probable potential for cracking in the carbonate-bicarbonate and caustic environments and at the free-corrosion potential in nitrate were then tested at other potentials in the carbonate-bicarbonate environment and the caustic environment.

An exploratory study was then started that involved mixing the best inhibitors with a coal-tar primer. The rates at which the inhibitors were leached from the primer were measured, and cracking tests with specimens coated with the inhibitor-containing primers were conducted.

EXPERIMENTAL PROCEDURE FOR EVALUATING INHIBITORS STRESS-CORROSION CRACKING EXPERIMENTS

The various chemicals were evaluated by determining whether they prevented or significantly retarded the formation of stress-corrosion cracks in specimens of pipe steel stressed in the three suspect environments. The specimens were machined from blanks cut from a joint of X-52 pipe that had developed stress-corrosion cracks in the field. The composition and mechanical properties of the steel are given in Tables 2 and 3.

The laboratory experiments in the carbonate-bicarbonate solution and hydroxide solution involved tests on smooth tensile specimens, consisting of rods 7 in. long and of 0.190 in. diameter having an intermediate section thereof smoothly necked down to provide a 0.1 in. diameter section over a length of 0.5 in.; the bars being threaded at the ends for connection to the testing apparatus. It was found that by using a low strain rate, a given experiment could be completed within a day, whereas the experiment might last several weeks if a deadweight load were used. Thus, a strain rate was used such that the specimen would fail within 24 hours, even if no stress-corrosion cracks developed. When SCC did occur, not only were failure times shorter, but the reduction in area (apparent ductility) of the specimens decreased, which made it possible to measure the propensity for SCC by measuring the decrease in reduction in area of the tensile specimen. The tensile specimens were continuously strained at a rate of $2.5 \times 10^{-6}$ sec$^{-1}$ at 180°F in either a 1 N $Na_2CO_3$ + 1N $NaHCO_3$ solution or in a 33 percent NaOH solution. The experiments were conducted at several different potentials at and near the potential where stress-corrosion cracking was expected to occur most readily. This precaution was taken in order to be certain that a given chemical additive that looked promising at one potential did not just shift the potential for the most rapid growth of stress-corrosion cracks to a different value.

The apparatus necessary for each constant-strain-rate experiment comprised a potentiostat to control the potential, a voltmeter to measure the potential, a recorder, a conventional straining rig, the load cell, the test cell, the heater tape for heating the solution, and a thermometer for measuring the temperature of the solution.

The experiments to evaluate inhibitors in the nitrate solution involved measuring the time to failure of a notched tensile specimen under a deadweight load. The test specimens for this purpose were 6 in. rods having end connections and an intermediate section 2 in. long having at its center a circumferential 60° notch. The diameter of the intermediate section was 0.248 in. ± 0.003 in.; the notch diameter being 0.175 ± 0.003 in.; the notch root radius being 0.003 in. Such a test method was practical, because times to failure in the nitrate solution were normally less than one day without the addition of an inhibitor. The notched tensile specimens were stressed in a conventional load cell in a boiling 20 percent $NH_4NO_3$ solution.

In all three environments, chemical additives were evaluated at the 0.01, 0.10 and 1.0 percent levels. The results of the experiments provided a measure of the effectiveness of the inhibitor. After each experiment, the specimens were examined either macroscopically or microscopically to confirm that stress-corrosion cracking had or had not occurred.

TABLE 2

CHEMICAL COMPOSITION OF X-52 STEEL USED FOR SPECIMENS EMPLOYED IN CRACKING EXPERIMENTS

| Element | Content, Percent |
|---|---|
| Carbon | 0.24 |
| Manganese | 0.91 |
| Phosphorus | 0.020 |
| Sulfur | 0.030 |
| Silicon | 0.06 |
| Copper | 0.15 |
| Nickel | 0.060 |
| Chromium | 0.070 |
| Molybdenum | 0.003* |
| Tungsten | 0.03** |
| Cobalt | 0.022* |
| Tin | 0.013 |
| Vanadium | <0.003** |
| Titanium | <0.001** |
| Zirconium | <0.003** |
| Columbium | <0.01** |
| Lead | 0.005 |
| Silver | <0.001** |
| Arsenic | <0.03** |
| Aluminum | <0.001* |
| Boron | <0.001** |
| Nitrogen | 0.006 |

*Approximate spectrographic analysis within a factor of 3.
**Element not detected. Lower limit of detectability indicated.

TABLE 3

MECHANICAL PROPERTIES OF X-52 STEEL USED FOR SPECIMENS EMPLOYED IN CRACKING EXPERIMENTS

| | |
|---|---|
| Yield Strength at 0.5 percent Total Strain, psi | 52,200 |
| Ultimate Tensile Strength, psi | 77,000 |
| Elongation in 2 Inches, Percent | 38 |
| Drop-Weight Tear Test, 80 Percent-Shear-Area Transition Temperature, F | 50 |

In order to determine whether the inhibitors were able to stop or retard an existing stress-corrosion crack, some experiments were conducted in which the inhibitor was added to the solution after a stress-corrosion crack had started in the specium. For the experiments with nitrates, the sustained-load apparatus described previously was employed. For the experiments with the carbonate-bicarbonate environment, precracked cantilever-beam specimens were used. The specimens for these tests were 9 in. cantilever beams 0.281 in. thick and one in. high having a notch at the center 0.125 in. wide and 0.375 in. deep with a 30° V-shaped bottom; leaving 0.50 in. of integral metal in the beam below a fatigue crack initiated in the bottom of the notch. These beams were supported at one end on a test frame and loaded with a dead weight at the opposite end. A corrosion cell containing the test liquid was then placed around the beam with the notch immersed in the test solution. As noted above, the specimens were precracked by fatigue and were then stressed in the 1N $Na_2CO_3$ + 1N $NaHCO_3$ solution at 175°F and −720 mv (CuCuSO$_4$). A dial gage was used to measure the rate of deflection of the specimen, the rate of deflection being an indication of the crack growth. When it was apparent that a stress-corrosion crack was growing under the load alone, either 1 percent calcium phosphate or sodium phosphate was added to the solution to determine whether the stress-corrosion crack could be stopped. This was determined by monitoring the deflection rate and by metallographic examination of the specimens after the experiments.

RESULTS OF INHIBITOR TESTS

For the initial screening, all of the chemicals were tested at the 1 weight percent level in at least one of the three suspect environments as follows. (Not all additives were completely soluble at the 1 weight percent level):

1. 1N $Na_2CO_3$ + 1N $NaHCO_3$ at 180°F and −720 mv (Cu-CuSO$_4$)
2. 33 weight percent NaOH at 180°F and −1000 mv (Cu-CuSO$_4$)
3. 20 weight percent $NH_4NO_3$ at boiling and free-corrosion potential.

The caustic and carbonate-bicarbonate tests were performed in the constant-strain-rate rig, whereas the nitrate tests were conducted in the constant-load apparatus. Some supplementary tests were made with bend specimens in the caustic and nitrate solutions. Chemicals were considered for further evaluation if they provided strong inhibition in the first environment in which they were tested. Specifically, by strong inhibition, it was meant that the specimens in the constant-strain-rate experiments exhibited at least 10 percentage points greater reduction in area than that exhibited in the absence of the inhibitor, and the specimens in the constant-load experiments survived at least 10 times as long as did those tested in the absence of the inhibitor. In other words, the chemicals that were not rejected after the first screening tests were characterized by one of the following results: a reduction in area in the carbonate-bicarbonate environment greater than 44 percent, a reduction in area in the caustic environment greater than 49 percent, or a lifetime in the nitrate environment greater than 80 hours.

The remaining chemicals were then evaluated at one potential in the two environments in which they had not been evaluated previously. Only a few of the many chemicals tested provided strong inhibition in all three environments. The data from these screening tests on the inhibitors of the invention are set forth below.

TABLE 4

RESULTS OF INHIBITOR-SCREENING TESTS

| | 33 Percent NaOH, Constant Strain Rate, $2.5 \times 10^{-6} sec^{-1}$ | | | | | 1N $Na_2CO_3$ - $NaHCO_3$, Constant Strain Rate, $2.5 \times 10^{-6} sec^{-1}$ | | | | |
|---|---|---|---|---|---|---|---|---|---|---|
| | Concentration percent | $t_f'$ hr | RA, percent | T, F | Pot, mv (Cu—CuSO$_4$) | Concentration, percent | $t_f'$ hr | RA, percent | T, F | Pot, mv (Cu—CuSO$_4$) |
| Calcium Monobasic Phosphate | 1 | 21.4 | 58 | 180 | −1035 | 1 | 21.4 | 49 | 180 | −750 |
| Sodium Monobasic Phosphate | 1 | 22.0 | 59 | 180 | −1040 | 1 | 21.4 | 54 | 180 | −750 |
| Sodium Tripolyphosphate | 1 | 20.6 | 45 | 180 | −1030 | 1 | 20.6 | 50 | 170 | −750 |
| Potassium silicate (Kasil 1) | 1 | 19.1 | 47 | 180 | −1010 | 1 | 18.0 | 40 | 180 | −770 |
| Potassium silicate (Kasil 6) | 1 | 20.0 | 44 | 180 | −1060 | 1 | 18.7 | 44 | 180 | −770 |
| Potassium silicate (Kasil 88) | 1 | 21.5 | 51 | 180 | −1010 | 1 | 21.2 | 49 | 180 | −735 |

| | 20 Percent $NH_4NO_3$, 90 Percent NTD | | | | 33 Percent NaOH + 0.1 Percent PbO, U-Bend | |
|---|---|---|---|---|---|---|
| | Concentration percent | $t_f'$ hr | T, F | Pot, mv (Cu—CuSO$_4$) | Concentration, percent | $t_f$ hr |
| Calcium Monobasic Phosphate | 1 | 1145 | B* | | 1 | 1350 |
| Sodium Monobasic Phosphate | 0.1 | 378.6 | B* | FCP** | 1 | 1180 |
| Sodium Tripolyphosphate | 1 | 1143.5 | B* | FCP** | | |
| Potassium silicate (Kasil 1) | 1 | 75.0 | B* | FCP** | | |
| Potassium silicate (Kasil 6) | 1 | 663.6 | B* | FCP** | | |
| Potassium silicate (Kasil 88) | 1 | NF 690*** | B* | FCP** | | |

*B = boiling
**FCP = Free-corrosion potential
***NF = no failure

INHIBITOR EVALUATION

Under pipeline operating conditions, the dissolved-solids content of the solution and the potential beneath the coating are expected to vary over a broad range. Wetting and drying during seasonal changes will affect the dissolved-solids content. This wetting and drying also will influence the pipe-to-soil potential beneath the coating, where the pipe-to-soil potential may range from a nominal protective value in the vicinity of −1.0 v (Cu-CuSO$_4$) at exposed areas, to the natural corrosion potential (possibly −0.2 v) far beneath the coating. Thus, it was necessary to evaluate extensively the inhibitors of the invention to insure that they did not accelerate stress-corrosion cracking at low concentration levels or were effective only because they shifted the most severe potential for cracking outside the range studied in the screening tests. Accordingly, the inhibitors were studied at concentration ranges of 0.01, 0.1, and 1 weight percent in the solutions containing 33 weight percent NaOH, 20 weight percent NH$_4$NO$_3$, and 1N Na$_2$CO$_3$ + 1N NaHCO$_3$. In addition, the constant-strain-rate tests were conducted at 25-mv potential intervals over a range of 200 to 300 mv in the caustic and the carbonate-bicarbonate solutions and at the free-corrosion potential and −175 mv (Cu-CuSO$_4$) in the nitrate solution (the latter potential represents some anodic stimulation above the free-corrosion potential and would not be expected to be encountered under normal cathodic-protection conditions, not even at crevices beneath coatings).

Typical results are shown in FIGS. 1 through 4 for sodium tripolyphosphate in 1N Na$_2$CO$_3$ + 1N NaHCO$_3$. Note that at the 1 weight percent level, the plot of potential versus reduction in area showed a minimum at −0.73 v (Cu-CuSO$_4$) of about 46 percent reduction in area and, thus, sodium tripolyphosphate was an effective inhibitor at this level. At the 0.1 weight percent level of Na$_5$P$_3$O$_{10}$, the minimum value of reduction in area was 40 percent, and the minimum had shifted more negative to −0.74 V and was near the top of the band obtained for the untreated carbonate-bicarbonate solution; therefore the chemical was judged to be only fairly effective at that concentration. At the 0.01 weight percent level, the minimum value of reduction in area was 36 percent at −0.74 v and was within the band for the untreated carbonate-bicarbonate solution, thus the chemical was judged not to be an effective inhibitor at that concentration.

Similar evaluations were made for all the prospective inhibitors and the results are presented in Table 5. Note that the inhibitors were most effective in the nitrate solution.

Of great importance to the evaluation was the result that none of the low levels of inhibitor caused increased susceptibility to cracking. Thus, while some of the chemicals might not be effective inhibitors for stress-corrosion cracking at very low levels, they would not be harmful.

Thus, the results indicate that the following are "safe" universal inhibitors for stress-corrosion in the three suspect environments:
 Sodium tripolyphosphate,
 Calcium monobasic phosphate,
 Sodium monobasic phosphate, and
 Potassium silicate.

TABLE 5

NUMERICAL DATA FROM THE FINAL EVALUATION OF THE INHIBITORS

| Inhibitor | Concentration percent | Minimum Reduction in Area, percent CO$_3$—HCO$_3$ | NaOH | $t_i/t_o$[a] for NO$_3$ |
|---|---|---|---|---|
| Calcium monobasic phosphate (Ca(H$_2$PO$_4$)$_2$.H$_2$O) | 1 | 44 | 47 | 86–143 |
|  | 0.1 | 40 | 40 | 75–125 |
|  | 0.01 | 32 | 43 | 14–145 |
| Sodium monobasic phosphate (NaH$_2$PO$_4$.H$_2$O) | 1 | 47 | 44 | >126–150 |
|  | 0.1 | 39 | 40 | 47–66 |
|  | 0.01 | 36 | 41 | 38–55 |
| Sodium tripolyphosphate (Na$_5$P$_3$O$_{10}$) | 1 | 46 | 45 | 141–>182 |
|  | 0.1 | 40 | 42 | 56–77 |
|  | 0.01 | 36 | 43 | 2–13 |
| Potassium silicate (9% K$_2$O, 20% SiO$_2$, 7% H$_2$O) | 1 | 41 | 51 | 1–86 |
|  | 0.1 | 35 | 48 | 1–6 |
|  | 0.01 | 32 | 43 | 1–>132 |

[a]Ratio of time to failure with inhibitor to time to failure without inhibitor.

TABLE 6

CONVERSIONS BETWEEN NUMERICAL EXPERIMENTAL RESULTS AND QUALITATIVE EVALUATIONS OF INHIBITORS

| Qualitative Rating | $t_i/t_o$[a] in Nitrates | Reduction of Area in Carbonate-Bicarbonate percent | Reduction of Area in Caustics, percent |
|---|---|---|---|
| No SCC | Infinity | 60 | 60 |
| Excellent | >9 | >44 | >47 |
| Good | 6–9 | 41–44 | 45–47 |
| Fair | 3–5 | 37–40 | 42–44 |
| No effect | 1–2 | 32–36 | 37–41 |
| Bad | <1 | <32 | <37 |

[a]Ratio of time to failure with inhibitor to time to failure without inhibitor.

TABLE 7

SUMMATION OF INHIBITOR EVALUATIONS

| Inhibitor | Concentration, percent | Carbonate-Bicarbonate[b] (Strain-Rate Tests) | 33% NaOH[a] (Strain-Rate Tests) | 20% Ammonium Nitrate[b] (Constant Load Tests) |
|---|---|---|---|---|
| Calcium monobasic phosphate [Ca(H$_2$PO$_4$)$_2$.H$_2$O] | 1 | Good | Good | Excellent |
|  | 0.1 | Fair | No effect | Excellent |
|  | 0.01 | No effect | Fair | Excellent |
| Sodium monobasic phosphate (NaH$_2$PO$_4$.H$_2$O) | 1 | Excellent | Fair | Excellent |
|  | 0.1 | Fair | No effect | Excellent |
|  | 0.01 | No effect | No effect | Excellent |
| Sodium tripolyphosphate (Na$_5$P$_3$O$_{10}$) | 1 | Excellent | Good | Excellent |
|  | 0.1 | Fair | Fair | Excellent |
|  | 0.01 | No effect | Fair | Good |
| Potassium silicate (9% K$_2$O, 20% SiO$_2$, 71% H$_2$O) | 1 | Good | Excellent | Good |
|  | 0.1 | No effect | Excellent | No effect |
|  | 0.01 | No effect | Fair | Good |

[a]At the worst potential.
[b]At the free-corrosion potential.

The above experiments demonstrated that the inhibitors are effective in preventing the initiation of stress-corrosion cracking in line-pipe steel. However, a question of practical importance is whether an inhibitor can also prevent propagation of existing stress-corrosion cracks in line-pipe steel. Accordingly, several experiments were conducted in nitrate and carbonate-bicarbonate solutions. In the nitrates (20 percent NH$_4$NO$_3$), the inhibitor in an amount equal to 1 percent by weight of the solution was added two hours after the experiment had started. The times to failure were than measured and the results are given in Table 8. The three phosphates lengthened the life of the specimens significantly.

TABLE 8

EFFECTIVENESS OF INHIBITORS IN RETARDING A GROWING CRACK IN PIPE STEEL IN 20 PERCENT NH$_4$NO$_3$ AT THE FREE-CORROSION POTENTIAL

| Inhibitor | Ratio of Failure Time With Inhibitor[a] To Failure Time Without | |
|---|---|---|
|  | Inhibitor Added Immediately | Inhibitor Added After 2 Hours |
| Calcium monobasic phosphate (Ca(H$_2$PO$_4$)$_2$.H$_2$O) | 24–>125 | 90–116 |
| Sodium monobasic phosphate (NaH$_2$PO$_4$.H$_2$O) | >125 | >146 |
| Sodium tripolyphosphate (Na$_5$P$_3$O$_{10}$) | >125 | 125–>140 |
| Potassium silicate (9% K$_2$O, 20% SiO$_2$, 71% H$_2$O) | 1–87 | 1 |

[a]At 1 percent level.

Figure 5:
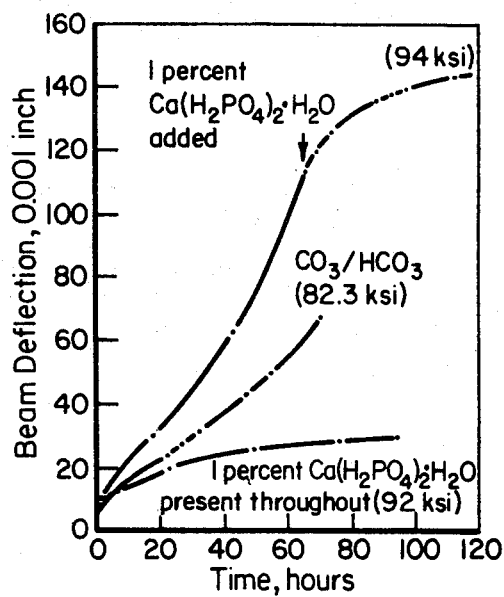
FIG. 5 is a graph showing the effect of calcium monobasic phosphate additions on the deformation of precracked, chevron-notched, cantilever-beam specimens in 1N $Na_2CO_3$ + 1N $NaHCO_3$ at 175°F and −720 mv (Cu-$CuSO_4$).
Figure 6:
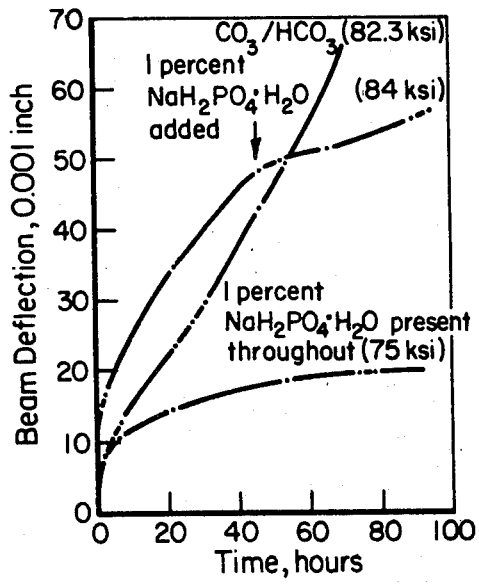
FIG. 6 is a graph showing the effect of sodium monobasic phosphate additions on the deformation of precracked, chevron-notched, cantilever-beam specimens in 1N $Na_2CO_3$ + 1N $NaHCO_3$ at 175°F. and −720 mv (Cu-$CuSO_4$).

For the experiments in the carbonate-bicarbonate solution (1N Na$_2$CO$_3$ + 1N NaHCO$_3$), precracked cantilever-beam specimens were used. In these experiments, the inhibitor was added to the environment either prior to the test or after stress-corrosion cracks were initiated. Results are shown in FIGS. 5 and 6 for calcium monobasic phophate and sodium monobasic phosphate. When the inhibitor was present at the outset of the test, the beam deflection-time curve exhibited a relationship typical of creep in an air environment. With no inhibitor addition, the beam-deflection curve followed the same relationship for the first 10 to 20 hours, and then the beam-deflection rate began to accelerate as the stress-corrosion crack began to propagate. (The stress-corrosion crack was confirmed by post-test metallographic examination. When the inhibitor was added during the time of accelerated beam deflection associated with stress-corrosion cracking, the beam-deflection rate immediately began to follow the relationship that is characteristic of no cracking.

Thus, the data revealed that the inhibitors of the invention can prevent the initiation of stress-corrosion cracks at sharp notches or cracks in the pipe steel and can stop the propagation of stress-corrosion cracks that were initiated prior to the use of the inhibitor.

The best mode presently contemplated for carrying out the invention is as follows:

EXAMPLE I

Compositions for inhibiting SCC in steel pipelines were prepared by separately blending each of the four inhibitors of the invention into a coal tar primer, the final compositions each containing 20% by weight of one of the four inhibitors, i.e., calcium monobasic phosphate, sodium monobasic phosphate, sodium tripolyphosphate and potassium silicate. The blending was carried out in conventional mixing apparatus and presented no problems although the phosphate-containing mixtures had a somewhat granular texture when hardened. The mixture containing the potassium silicate in 20% concentration formed a gel and did not harden and thus, while useful, coal tar per se is not the preferred vehicle for the application of the potassium silicate inhibitor to a pipeline since the gel is subject to mechanical removal.

In order to evaluate the coal tar-phosphate inhibitor primer compositions, they were painted on glass plates to produce thin films which allowed allowd to harden. These hardened films were then stripped from the glass plates and 1 gram of each film was soaked at 140°F. in 250 ml of a given solution to determine the leaching characteristics of the inhibitor in each film. The solutions used were 1N $Na_2CO_3$ + 1N $NaHCO_3$, 20% $NH_4NO_3$, 33% NaOH, distilled water, and a simulated groundwater (3% $Na_2CO_3$ + 0.1% NaCl + 0.005% $NaNO_3$). Periodically the solutions were removed for chemical analysis and replaced by fresh solution. The results of the leaching tests in the five different solutions are set forth in Table 9.

TABLE 9

RESULTS OF LEACHING EXPERIMENTS
WITH INHIBITOR-DOPED PRIMERS
(250 Ml Solution at 140 F)

| Inhibitor | Solution | Inhibitor In Primer[a] mg | Inhibitor Leached By Solution, mg, in Indicated Time Interval | | | | |
|---|---|---|---|---|---|---|---|
| | | | 0–2 Months | 0–4 Months | 2–5 Months | 4–6 Months | 6–9 Months |
| Calcium monobasic phosphate | $CO_3/HCO_3$[b] | 151 | 63.0 | — | 9.0 | — | — |
| | 20% $HN_4NO_3$ | 151 | 37.5 | — | 5.25 | — | — |
| | Dist. water | 151 | 80.0 | — | 5.25 | — | — |
| | Groundwater[c] | 151 | 77.5 | — | 6.25 | — | — |
| | 33% NaOH | 151 | — | 55.0 | — | None | None |
| Sodium monobasic phosphate | $CO_3/HCO_3$[b] | 138 | 4.0 | — | 2.0 | — | — |
| | 20% $NH_4NO_3$ | 138 | 35.0 | — | 1.25 | — | — |
| | Dist. water | 138 | 57.5 | — | 5.75 | — | — |
| | Groundwater[c] | 138 | 32.5 | — | 10.25 | — | — |
| | 33% NaOH | 138 | — | 39.0 | — | 2.25 | None |
| Sodium tripoly-phosphate | $CO_3/HCO_3$[b] | 138 | 15.25 | — | — | — | — |
| | 20% $NH_4NO_3$ | 138 | 177.5[d] | — | — | — | — |
| | Dist. water | 138 | 12.25 | — | — | — | — |
| | Groundwater[c] | 138 | 9.0 | — | — | — | — |
| | 33% NaOH | 138 | 9.25 | — | — | — | — |

[a]As $PO_4$ in 1 g of primer.
[b]1N $Na_2CO_3$ + 1N $NaHCO_3$.
[c]A simulated groundwater: 3 percent $Na_2CO_3$ + 0.1 percent NaCl + 0.005 percent $NaNO_3$.
[d]This value is obviously too high, but the source of error in the chemical analysis is not known.

CRACKING EXPERIMENTS WITH COATED SPECIMENS

A series of experiments involving bend specimens was conducted to measure the effectiveness of various inhibitor-containing primers in preventing SCC. In these experiments, primers that contained 20 percent sodium monobasic phosphate, calcium monobasic phosphate, sodium tripolyphosphate, or potassium silicate were used. The primer was applied to notched bend specimens, and the specimens were placed in a four-point bending rig and stressed beyond the yield strength. The bend specimens were 3.4 in. plates 0.5 in. wide and 0.1 inch thick, having a lateral 60° 0.03 in. V-shaped notch at the center. The entire bend rig was then placed in 750 ml of a 20% $NH_4NO_3$ solution at 200°F. This procedure allowed for a maximum of about 0.001 percent inhibitor entering the solution if all the inhibitor was leached from the primer. Some bend specimens were not coated, some were coated with plain primer, and others were coated with inhibitor-containing primer. Of the coated specimens, some were coated completely, whereas on others, the notch was left exposed to the environment. The times to failure of the bend specimens were then compared to determine whether the chemical additives increased the resistance of the specimens to SCC.

As is shown in Table 10, all of the specimens coated completely with inhibitor-containing primers exhibited longer failure times than did specimens coated with plain primer with no inhibitor.

TABLE 10

RESULTS OF STRESS-CORROSION TESTS
IN INHIBITOR-DOPED, COAL TAR PRIMERS
(Four-Point-Loaded, Notched, Bent Beams In 20
Percent $NH_4NO_3$ at 200 F and the Free-Corrosion Potential)

| Inhibitor Addition[a] | Time To Failure, days | |
|---|---|---|
| | Coated Except Notch | Completely Coated |
| Bare, no coating | 5, 6, 24 | — |
| No inhibitor | 2, 3, 6 | 15 |
| $NaH_2PO_4.H_2O$ | 7, 16, 16 | 16, 26, 50 |
| $Ca(H_2PO_4)_2.H_2O$ | 16, 16, 23 | 41, 196 |
| $Na_5P_3O_{10}$ | 3, 24 | >140, >140 |
| Potassium silicate | 3, 3 | 120 |

[a]20 weight percent inhibitor in primer.

None of the inhibitors was effective in preventing cracking when the bare steel was exposed at the notch. This result appears to be contradictory, because the leaching tests indicated that the inhibitors should have been leached from the adjacent coating to protect the bare steel. However, it is believed that the small amount of inhibitor present in the coating (0.001 percent of the weight of the liquid used) was not sufficient to prevent SCC. Such an effect would not be expected in service where solution volumes beneath coatings are extremely small, and, thus, the percentage of inhibitor present would be greater.

While the incorporation of the inhibitors of the invention in coal tar-based primers is presently the demonstrated method of application to the pipeline, particularly for the phosphate inhibitors, it will be obvious to those skilled in the art that any other suitable means of introducing and maintaining the inhibitors in the environment adjacent the pipeline would be useful in inhibiting SCC. Asphalt based and epoxy based compositions can be treated in a comparable manner. As noted above, the inhibitors can be incorporated in a coating on the pipeline itself, either applied to the pipe before the pipeline is assembled or at the time the pipeline is laid; the former practice being preferred. The inhibitor may be incorporated in a primer coat on the pipe, in a second coating over a conventional primer, or in any subsequent coating, or top coat, or indeed, in more than one of these coats; the only requirements for such coatings being that they be compatible with the pipeline and inhibitor and, preferably, that they be ecologically satisfactory, i.e., non-poisonous to the environment. One convenient manner of applying the inhibitors is as a filler in a composition having adhesion for metal. Inasmuch as many such compositions are known to the art and it is common practice to add inert fillers to such adhesives, those skilled in the metal adhesive art will understand how such formulations can be made by conventional blending techniques using available adhesives.

Still another method of applying the inhibitors to the pipeline is to incorporate them in a tape which is subsequently applied to the pipe. Such a tape may take any suitable form and may, for example, have a backing element of paper, textile fabric, plastic or metal and an adhesive or non-adhesive layer on the backing which is applied against the surface of the pipe. The layer adjacent the pipe preferably contains the inhibitor, although less preferably the inhibitor-containing layer may be on the outside or in an intermediate layer of the tape. As with the adhesive formulations referred to above, the tape may include a layer of conventional or special adhesive containing the inhibitor.

As noted above, the inhibitors may be simply dispersed in the environment surrounding the pipeline. This may be done in a variety of ways. For example, the inhibitors may be blended in soil, sand or aggregate and placed above and/or around the pipeline. The inhibitors also may be dissolved in water and simply sprayed on the pipeline and the adjacent soil.

Still another method of applying the inhibitors is to incorporate them in a slurry of a cementitious composition of any type and apply them by spraying under pressure as in the "Gunnite" method. Having thus described the inhibitors of the invention and a number of methods for applying them to pipelines to be protected and introducing them to the environment adjacent the pipeline for this purpose, it is believed that other similar methods of application will be obvious to those skilled in the art, as well as specific inhibitor-containing formulations, tapes, etc.

The concentration of the inhibitors required to provide adequate protection will, of course, vary with the particular pipe steel and environmental conditions involved, as well as with other factors such as the method of application of the inhibitor. In general, however, it is believed that the inhibitors should be present in amounts sufficient to provide from about 0.1 to about 10% by weight of the content of deleterious material in soluble form in the environment, i.e., the alkali metal and alkaline earth metal hydroxides, carbonates and bicarbonates. It is possible that a useful degree of protection could be achieved in certain instances at concentrations of less than 0.1%, but it will generally be economic to provide at least that high a concentration and for this reason there would be no reason to forego the degree of protection afforded at that level. Similarly, while it would be possible to provide more than 10% of the inhibitor based on the concentration of deleterious material in soluble form, it is believed that adequate protection will generally be provided at that level and even lower levels, and for this reason it would be unnecessary and uneconomic to employ higher levels of inhibitor.

As noted above, the inhibitors may be employed singly or in combination, and any one of the four inhibitors will provide significant benefit in any of the three environments, although there are several preferred combinations of inhibitors and environment if the environment is known. For example, for cracking due to nitrates or carbonates, only one or more of the phosphate inhibitors need be employed. On the other hand, where cracking is due to caustics alone, only the silicate inhibitor need be employed. Inasmuch as environments and conditions change from place to place along the pipeline and from time to time, it is generally preferred to attempt to employ only the type of inhibitor needed for the type of environment expected to be present. Therefore, it is preferred to employ the silicate inhibitor in combination with at least one of the phosphate inhibitors. Compositions containing more than one of the phosphate inhibitors as well as potassium silicate, are especially preferred. The concentration of the inhibitor in the inhibitor composition may vary over wide limits, e.g., from 1 to 99% inhibitor in the composition. In general, the maximum amount of inhibitor that can be added to a primer, top coat or adhesive layer will be limited by its effect on other properties of the coating, such as resistance to water penetration or cathodic disbonding. It is anticipated that optimum contents of inhibitor will vary between 0.5 and 10%, depending on the specific coating system. The maximum amount of inhibitor, consistent with satisfactory coating performance should be used and should be determined for each case. On the other hand, when the inhibitors are applied to the environment itself as by spraying an aqueous solution thereon or by mixing the inhibitor with the soil or an inert carrier spread on or mixed in the soil, any suitable concentration may be employed in the inhibitor composition which will provide the desired 0.1 to 1% concentration of inhibitor in the environment, based on the concentration of soluble deleterious material therein.

Generally, the inhibitor compositions may be applied at ambient temperatures, however, in certain applications such as in coal tar, asphalt or epoxy based inhibitor compositions it may be necessary or desirable to apply the inhibitors at elevated temperatures. Obviously, such temperatures must not destroy the inhibitor if adequate inhibition is to be obtained. In order to evaluate the effect of such application heat on the four inhibitors of the invention, compositions were prepared containing these inhibitors, placed in each of the three deleterious environments and held there for one hour at 500°F. The temperature of 500°F. was chosen because it represents the maximum temperature that would be expected in the application of coal-tar, asphalt, or epoxy coatings. The results of the recent experiments are compared with the results of the earlier experiments in Table 11 below. The numerical values of reduction in area for specimens treated with the inhibitors in the as-received condition represent the minimum of at least 5 values obtained at various potentials within the range where stress-corrosion cracking is possible. Each numerical value for specimens treated with the baked inhibitors represents The result of a single test. Consequently, indications of improvement after baking are not necessarily significant, since a larger number of tests might produce some lower values. In order to make the data more meaningful, qualitative ratings (excellent, good, etc.) have been included with the numerical data. The qualitative ratings were assigned according to the scheme presented in Table 7 above.

TABLE 11
EFFECT OF BAKING FOR 1 HOUR AT 500 F ON INHIBITOR EVALUATIONS

| Inhibitor[a] | Condition | R.A. in $CO_3$—$HCO_3$[b] | R.A. in NaOH[c] | $t_i/t_o$ in $NH_4NO_3$[d] |
|---|---|---|---|---|
| Sodium monobasic phosphate $NaH_2PO_4 \cdot H_2O$ | As received | 47 (Excellent) | 44 (Fair) | >126–150(Excellent) |
| | Baked | 45 (Excellent) | 35 (Bad) | 1,2,>125 (Fair) |
| Calcium monobasic phosphate $Ca(H_2PO_4)_2 \cdot H_2O$ | As received | 44 (Good) | 47 (Good) | 86–143 (Excellent) |
| | Baked | 49 (Excellent) | 45 (Good) | >125 (Excellent) |
| Sodium tripolyphosphate $Na_5P_3O_{10}$ | As received | 46 (Excellent) | 45 (Good) | 141–>182 (Excellent) |
| | Baked | 50 (Excellent) | 53 (Excellent) | >125 (Excellent) |
| Potassium silicate (9% $K_2O$, 20% $SiO_2$ 71% $H_2O$) | As received | 41 (Good) | 51 (Excellent) | 1–86 (Good) |
| | Baked | 55 (Excellent) | 49 (Excellent) | 1 (No effect) |

[a]AT 1% level.
[b]Reduction in area exhibited by specimens pulled at a strain rate of $2.5 \times 10^{-6}$ sec$^{-1}$ in a1N $Na_2CO_3$-1N $NaHCO_3$ solution at 180 F.
[c]Reduction in area exhibited by specimens pulled at a strain rate of $2.5 \times 10^{-6}$ sec$^{-1}$ in a33 percent NaOH solution at 180 F.
[d]Ratio of time to failure with inhibitor to time to failure without inhibitor for specimens dead-weightloaded to 90% of the notch tensile strength in boiling 20 percent $NH_4NO_3$.

It can be seen from Table 11 above that the effectiveness of sodium tripolyphosphate was not reduced by the baking treatment. The performance of calcium monobasic phosphate also was not affected with the possible exception of its behavior in the sodium hydroxide solution. The sodium monobasic phosphate definitely lost its effectiveness in the sodium hydroxide solution, and the baked potassium silicate was not effective in the nitrate solution. In other words, of the four inhibitors, the sodium tripolyphosphate would be safest to use if the material would be subjected to such elevated temperatures. Essentially that would be an important consideration for coal-tar, asphalt, and epoxy coatings. For tape and extruded plastic coatings, all four inhibitors would be acceptable.

The effects of the baking treatments probably can be explained in terms of the stabilities and solubilities of the inhibitors. Sodium tripolyphosphate is stable at all temperatures up to its melting point, whereas sodium monobasic phosphate and calcium monobasic phosphate decompose at temperatures near 400°F. The water is driven from the potassium silicate around 212°F, after which the potassium silicate exists as crystals. The difficulty of dissolving the crystals probably accounts for the poor performance in the nitrate solution.

CONTROLLING THE POTENTIAL

It has been demonstrated many times that stress-corrosion cracking will occur only within a limited range of potentials for any given environment. The critical potential ranges for pipe steels in several environments are listed in Table 12. The ranges should be considered as approximate because they are affected somewhat by factors such as temperature, composition of the steel, and concentration of the environment. If it would be possible to keep the potential of the pipe out of the critical ranges with the cathodic protection systems that exist on almost every major pipeline, such a solution to the problem would be economically desirable because it would not involve an appreciable amount of new capital equipment. Unfortunately, shielding effects due to disbonded or undercut coating prevent the full effect of the cathodic current from being realized at places other than those directly exposed to the soil, and it is in those partially shielded places that stress-corrosion cracking probably occurs. It is, therefore, necessary to use the inhibitors of the invention to augment the protection provided by cathodic means.

TABLE 12
APPROXIMATE RANGES OF POTENTIAL IN WHICH STRESS-CORROSION CRACKING OF PIPE STEEL IS POSSIBLE

| Environment | Range of Potentials, mv vs. Cu—$CuSO_4$ |
|---|---|
| 1 N $Na_2CO_3$ + 1 N $NaHCO_3$ at 82°C. (180°F.) | −690 to −750 |
| 1 N $NaHCO_3$ at 75°C (167°F) | −570 to −770 |
| 33% NaOH at 82°C (180°F) | −970 to −1100 |
| 20% $NH_4NO_3$ at 102°C (216°F) | −470 to 0[a] |

[a]Upper limit probably much higher.

While the invention has been described above in conjunction with certain specific preferred embodiments thereof, it will be understood by those skilled in the art that numerous other embodiments are possible and that the scope of the invention is limited only by the appended claims and the prior art.

What is claimed is:

1. A method for inhibiting stress-corrosion cracking of a steel pipeline transmitting gas under elevated pressure provided with an external protective coating and means for cathodic protection, and which is in contact with an environment containing at least one material selected from the group consisting of the alkali metal and alkaline earth metal hydroxides, carbonates and nitrates, which comprises: introducing to the environment in contact with said pipeline a composition comprising at least one inhibitor selected from the group consisting of
   calcium monobasic phosphate,
   sodium monobasic phosphate,
   sodium tripolyphosphate, and
   potassium silicate;
in an amount sufficient to provide an inhibitor concentration effective to inhibit stress-corrosion cracking of said pipeline.

2. A method according to claim 1 wherein the environment contains at least one material selected from the group consisting of the alkali metal and alkaline earth metal hydroxides and wherein the inhibitor is potassium silicate.

3. A method according to claim 1 wherein the environment contains at least one material selected from the group consisting of the alkali metal and alkaline earth metal carbonates and nitrates and wherein the inhibitor is selected from the group consisting of calcium monobasic phosphate, sodium monobasic phosphate and sodium tripolyphosphate.

4. A method according to claim 3 wherein the inhibitor is calcium monobasic phosphate.

5. A method according to claim 3 wherein the inhibitor is sodium monobasic phosphate.

6. A method according to claim 3 wherein the inhibitor is sodium tripolyphosphate.

7. A method according to claim 1 wherein the environment contains at least one material selected from the group consisting of the alkali metal and alkaline earth metal hydroxides and at least one material selected from the group consisting of the alkali metal and alkaline earth metal carbonates, bicarbonates, and nitrates, and wherein the inhibitor comprises potassium silicate and at least one additional inhibitor selected from the group consisting of calcium monobasic phosphate, sodium monobasic phosphate and sodium tripolyphosphate.

8. A method according to claim 7 wherein the additional inhibitor is calcium monobasic phosphate.

9. A method according to claim 7 wherein the additional inhibitor is sodium monobasic phosphate.

10. A method according to claim 7 wherein the additional inhibitor is sodium tripolyphosphate.

11. A method according to claim 1 wherein the inhibitor is incorporated in a coating applied to the pipeline to be protected.

12. A method according to claim 11 wherein the coating containing the inhibitor comprises coal tar.

13. A method according to claim 11 wherein the coating containing the inhibitor comprises an asphalt material.

14. A method according to claim 11 wherein the coating comprises an epoxy resin.

15. A method according to claim 11 wherein the inhibitor is incorporated in a prime coating on said pipeline.

16. A method according to claim 11 wherein the inhibitor is incorporated in an intermediate coating on said pipeline.

17. A method according to claim 11 wherein the inhibitor is incorporated in a top coating on said pipeline.

18. A method according to claim 1 wherein the inhibitor is mixed with an inert solid material and mixed with the soil adjacent the pipeline to be protected.

19. A method according to claim 1 wherein the inhibitor is introduced to the environment adjacent the pipeline to be protected by application thereto in an aqueous solution.

20. A method according to claim 1 wherein said inhibitor is incorporated in a cement material applied to said pipeline by spraying.

* * * * *